(12) United States Patent
Mousavi et al.

(10) Patent No.: US 12,505,622 B2
(45) Date of Patent: Dec. 23, 2025

(54) METHOD FOR MODELLING A HEART VALVE

(71) Applicant: PREDISURGE, Saint-Etienne (FR)

(72) Inventors: S. Jamaleddin Mousavi, Sorbiers (FR); David Perrin, Lyons (FR)

(73) Assignee: PREDISURGE, Saint-Etienne (FR)

( * ) Notice: Subject to any disclaimer, the term of this patent is extended or adjusted under 35 U.S.C. 154(b) by 159 days.

(21) Appl. No.: 18/555,068

(22) PCT Filed: Apr. 14, 2022

(86) PCT No.: PCT/EP2022/060135
§ 371 (c)(1),
(2) Date: Oct. 12, 2023

(87) PCT Pub. No.: WO2022/219163
PCT Pub. Date: Oct. 20, 2022

(65) Prior Publication Data
US 2024/0212283 A1    Jun. 27, 2024

(30) Foreign Application Priority Data
Apr. 16, 2021    (EP) ..................... 21305509

(51) Int. Cl.
G06T 17/20    (2006.01)
G06T 7/00    (2017.01)
G06T 7/60    (2017.01)
G06T 7/73    (2017.01)

(52) U.S. Cl.
CPC .......... *G06T 17/205* (2013.01); *G06T 7/0012* (2013.01); *G06T 7/60* (2013.01); *G06T 7/73* (2017.01); *G06T 2200/24* (2013.01); *G06T 2207/10016* (2013.01); *G06T 2207/20092* (2013.01); *G06T 2207/30048* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2014/0071125 A1 | 3/2014 | Burlina et al. | |
| 2014/0125691 A1* | 5/2014 | Lysyansky | A61B 8/486 345/672 |
| 2018/0153514 A1* | 6/2018 | Zhai | A61B 5/02444 |

OTHER PUBLICATIONS

International Search Report issued Jul. 19, 2022, in corresponding International Application No. PCT/EP2022/060135, 4 pages.
Zhang Fan et al, "Towards patient-specific modeling of mitral valve repair: 3D transesophageal echocardiography-derived parameter estimation", Medical Image Analysis, vol. 35, Sep. 27, 2016, pp. 599-609, XP029801734, ISSN: 1361-8415, 11 pages.

* cited by examiner

*Primary Examiner* — Frank S Chen
(74) *Attorney, Agent, or Firm* — Maier & Maier, PLLC

(57) ABSTRACT

A computer-implemented method, a computer program, a storage medium, and a system for reconstructing a geometry of the mitral valve of a subject as open and as closed, based on a sequence of echography images acquired from the subject. The sequence of echography images represents the mitral valve apparatus during at least one heart cycle.

16 Claims, 5 Drawing Sheets

METHOD FOR MODELLING A HEART VALVE

FIELD

The invention concerns a computer-implemented method for reconstructing a geometry of the mitral valve of a subject, based on a sequence of echography images acquired from the subject, the sequence of echography images representing the mitral valve apparatus during at least one heart cycle.

The invention further concerns a corresponding computer program and system.

The present invention pertains to the field of 3D modeling. In particular, the invention relates to the modeling of the mitral valve geometry on the basis of echography images.

BACKGROUND

Mitral valve regurgitation is a progressive condition in which insufficient coaptation of the mitral valve leaflets causes a retrograde flow from the left ventricle into the left atrium.

It is one of the most common valvular heart diseases. In industrialized countries, it is present in 2% of the population.

The prevalence of mitral regurgitation is expected to increase in the future, due to population ageing.

An accurate and personalized representation of the mitral valve geometry is essential for mitral valve assessment, surgical planning and follow-up.

Several approaches have been proposed to reconstruct the mitral valve geometry of a subject from medical images, such as echocardiography or computer tomography images, via image segmentation and subsequent discretization into polygonal or polyhedral finite element meshes.

Today, echocardiography (2D or 3D) techniques is the recommended first-line imaging modality for pre-, intra- and post-operative mitral valve assessment. 3D+t (or 4D) transesophageal echocardiography allows to visualize the mitral valve apparatus during the heart cycle. Doppler echocardiography permits to evaluate hemodynamic parameters.

Cardiovascular computer tomography (CT) typically has better spatial resolution than echocardiography.

However, cardiovascular CT requires expensive equipment, it involves the exposure to ionizing radiations, and synchronization with ECG may be needed (ECG gated CT-scans) to ensure image quality, which significantly increases the image acquisition time. Moreover, it cannot provide hemodynamic characterization. For these reasons, the use of CT for mitral valve assessment is still limited to research purposes or second-line imaging modality, i.e. to be performed in case first-line methods provide poor images.

Thus, there is a need for methods and systems providing an accurate and personalized geometrical representation of the mitral valve, on the basis of echography images. More in particular, there is a need for a geometrical representation of the mitral valve apparatus as open and as closed.

The goal of the present invention is to provide an accurate, personalized geometrical representation of the mitral valve apparatus.

It is also a goal of the present invention to provide a geometrical representation of the mitral valve apparatus as open and as closed.

Furthermore, it is an objective of the present invention to provide a method and system for modelling the mitral valve geometry, which can be easily implemented into the clinical practice, particularly from pre-intervention planification purposes.

SUMMARY

To this end, the present invention relates to a computer-implemented method of the aforementioned type, the method comprising the following steps:
  generating a mesh of the open mitral valve based on a subset of open instance images in the sequence of echography images;
  generating a mesh of the closed mitral valve based on a subset of closed instance images in the sequence of echography images;
  identifying a position of papillary muscle tips of the subject in the subset of open instance images and a position of the papillary muscle tips in the subset of closed instance images;
  for at least one predefined zone of each leaflet of the mitral valve, determining a corresponding open position in the mesh of the open mitral valve, and a corresponding closed position in the mesh of the closed mitral valve;
  deriving a first chordae geometry, based on the identified position of the papillary muscle tips in the subset of closed instance images and on the determined closed position of each predefined zone;
  deforming the first chordae geometry based on a result of comparing:
    the identified positions of the papillary muscle tips in the subset of open instance images and in the subset of closed instance images; and
    for each predefined zone, the corresponding determined open position and closed position,
  so as to obtain a deformed chordae geometry.

The meshes of the open and closed mitral valve reproduce the anatomy of the mitral valve of the subject in the open and configuration, respectively, with elevated fidelity, because each of them is obtained on the basis of a subset of images in the sequence of echography images.

The first and the deformed chordae geometries thus obtained reproduce the geometry of the chordae tendineae of the subject when the mitral valve is closed and open, respectively.

Advantageously, the representation of the chordae tendineae is accurate because it is image-based: the first chordae geometry comprises information from the subset of closed instance images and the mesh of the closed mitral valve, and the deformed chordae geometry comprises further information from the subset of open instance images and the mesh of the open mitral valve.

In one embodiment, the method further comprises inserting the first chordae geometry to the mesh of the closed mitral valve so as to obtain an updated mesh of the closed mitral valve, the updated mesh of the closed mitral valve being a reconstruction of the geometry of the mitral valve as closed.

Advantageously, the updated mesh of the closed mitral valve reproduces the anatomy of the mitral valve of the subject in the closed configuration with elevated fidelity.

Furthermore, the updated mesh thus obtained allow to reconstruct the complete geometry of the mitral valve as closed, because it comprises information related to the anterior and posterior leaflets, the papillary muscles tips and the chordae.

In one embodiment, the method further comprises inserting the deformed chordae geometry to the mesh of the open mitral valve so as to obtain an updated mesh of the open mitral valve, the updated mesh of the open mitral valve being a reconstruction of the geometry of the mitral valve as open.

Advantageously, the updated mesh of the open mitral valve reproduces the anatomy of the mitral valve of the subject in the open, i.e. partly open or fully open, configuration with elevated fidelity.

Furthermore, the updated mesh thus obtained allow to reconstruct the complete geometry of the mitral valve as open, because it comprises information related to the anterior and posterior leaflets, the papillary muscles tips and the chordae.

In one embodiment, the mesh of the closed mitral valve is generated on the basis of the mesh of the open mitral valve.

This embodiment allows to obtain the mesh of the closed mitral valve on the basis of the mesh of the open mitral valve, for instance by morphing.

In one embodiment, the step of generating the mesh of the closed mitral valve comprises:
  selecting at least one target landmark in the subset of closed instance images;
  selecting at least two reference landmarks in the subset of open instance images;
  deriving the position, in a predetermined reference frame, of the at least two reference landmarks and the at least one target landmark;
  morphing the mesh of the open mitral valve based on the position of the at least two reference landmarks and the at least one target landmark to generate the mesh of the closed mitral valve.

This embodiment allows to obtain the mesh of the closed mitral valve via a morphing step.

In one embodiment, the at least one target landmark comprises a point lying on the coaptation line between the leaflets of the mitral valve.

By selecting at least one point on the coaptation line, it is possible to accurately reproduce the coaptation zone in the meshes of the mitral valve.

In one embodiment, the step of selecting the at least two reference landmarks comprises:
  on the subset of open instance images, identifying the two lines that most closely fit the leaflets of the mitral valve;
  selecting, as reference landmarks, at least one point lying on each of said two lines.

This embodiment allows to generate a mesh of the mitral valve which comprises both the anterior and posterior mitral valve leaflets.

Of note, it is possible to perform this step before generating the mesh of open mitral valve. For instance, it is possible to collect the two lines that most closely fit the mitral valve leaflets and saving the points lying on said lines. Then, the lines can be successively used for generating a middle plane of each leaflet of the mitral valve and/or for generating the mesh of open mitral valve; while the saved points can be used as reference landmarks in the next mesh generation step. This allows to reduce the computational time by simultaneously performing image segmentation and landmarks selection.

In one embodiment, the at least two reference landmarks comprise the endpoints of the lines that most closely fit mitral valve leaflets.

The endpoints correspond to the free margins and the annulus-attached margins of the mitral valve leaflets. These boundaries are also visible in closed instance images.

In one embodiment, the step of deriving the first chordae geometry comprises:
  for each leaflet, identifying corresponding leaflet boundaries;
  distributing, in the mesh of the closed mitral valve, first and second chordae extremities:
    each first chordae extremity being located at a corresponding position of the identified positions of the papillary muscle tips;
    each second chordae extremity being located at the closed position of a respective predefined zone;
  for each chordae of the first chordae geometry, deriving an associated chordae length as a distance between the corresponding first and second chordae extremities,
wherein each predefined zone is located at a respective predetermined distance from a corresponding leaflet boundary.

This embodiment allows to model the chordae as linear elements connecting the papillary muscles to the leaflets' boundaries.

The leaflets' boundaries comprise the free edge of the leaflets, and the basal edge of the leaflets, which is close to annulus.

Advantageously, on the basis of said predetermined distance, it is possible to obtain a chordae geometry which is close to the geometry of the marginal chordae, the basal chordae and/or the strut chordae of the subject.

In one embodiment, the method further comprises:
  defining a longitudinal axis in the subset of open instance images;
  deriving a sheaf of planes about the longitudinal axis;
  sampling, from the sheaf of planes, a set of planes spaced about the longitudinal axis, and intersecting said set of planes with the subset of closed instance images, so as to obtain sections of said subset of closed instance images.

This embodiment allows to obtain, from three-dimensional subsets of images, some bidimensional sections which are representative of the whole mitral valve volume. Therefore, it is possible to perform one or more than one step of the method of the invention on each bidimensional section.

Moreover, the use of a sheaf of planes about the longitudinal axis ensure that the mitral valve leaflets are entirely comprised in the sections obtained intersecting the sampled planes and the subset of closed or open instance images.

In one embodiment, the method further comprises:
  selecting at least one point on each section described hereabove;
  interpolating the at least one selected point on each section, so as to obtain a middle plane of each leaflet of the mitral valve.

In this embodiment, each predefined zone is preferably located on the obtained the middle plane.

The middle plane of the mitral valve leaflets, which is a three-dimensional surface, may be used to detect the anterior and posterior leaflet boundaries as explained hereabove.

The middle plane of the mitral valve leaflets may also be used for the generation of the meshes of the open and closed mitral valve, for instance by adding a predetermined thickness to the three-dimensional surface thus obtained.

In one embodiment, the method comprises: distributing N first chordae extremities on the position of the papillary muscle tips and M second chordae extremities at the closed position of the respective predefined zone, N and M being integers, M being greater than or equal to N.

This embodiment allows to select an uneven number of chordae extremities on the papillary muscles' tips and on the mitral valve leaflets, when M is greater than N. This allows to reconstruct one or several chordae as an element which has one extremity proximal to the papillary muscles, and more than one extremity on mitral valve leaflets' side. The resulting geometry is a more accurate reproduction of the real chordae anatomy, as they branch off from a main body on the mitral valve leaflets' side.

Preferably, N is comprised between 20 and 38. In this case, the number of chordae obtained with the present method correspond to the number of chordae tendinae present in humans.

In one embodiment, the number M of second chordae extremities which are distributed on the leaflet bodies is comprised between 4 and 30, advantageously between 10 and 20.

In one embodiment, the step of inserting the first chordae geometry to the mesh of the closed mitral valve comprises inserting beam elements joining the first chordae extremities and the second chordae extremities.

This allows to obtain an updated mesh of the closed mitral valve in which the chordae geometry comprises beam elements.

In one embodiment, the step of deforming the first chordae geometry comprises:
  displacing the first chordae extremities from the position of the papillary muscle tips in the subset of closed instance images to the position of the papillary muscle tips in the subset of open instance images;
  displacing the second chordae extremities from the closed position of the predefined zone, to the open position of said predefined zone,
  so as to obtain the deformed chordae geometry.

Therefore, the deformed chordae geometry accurately reproduces the subject's anatomy because it is based on the displacement of the papillary muscles and of the leaflets of the mitral valve during the heart cycle. More precisely, the deformed chordae geometry is based on the displacements of the position of the papillary muscles and of the predefined zone of each leaflet of the mitral valve from the instant of time in which the mitral valve is open to the instant of time in which the mitral valve is closed.

The present invention also relates to a computer program comprising program code instructions which, when executed by a computer, cause the computer to carry out at least the steps of: generating a mesh of the open mitral valve, generating a mesh of the closed mitral valve, deriving a first chordae geometry, deforming the first chordae geometry according to any one of the embodiments described hereabove.

The present invention also relates to a non-volatile computer storage medium comprising instructions which, when executed by a computer, cause the computer to carry out at least the steps of generating a mesh of the open mitral valve, generating a mesh of the closed mitral valve, deriving a first chordae geometry, deforming the first chordae geometry according to any one of the embodiments described hereabove.

Furthermore, the present invention relates to a system for modeling the geometry of the mitral valve of a subject based on a sequence of echography images acquired from the subject, the sequence of echography images representing the mitral valve apparatus during at least one heart cycle, the system comprising at least one processing unit configured to:
  generate a mesh of the open mitral valve based on a subset of open instance images;
  generate a mesh of the closed mitral valve based on a subset of closed instance images in the sequence of echography images;
  identify a position of the papillary muscle tips of the subject in the subset of open instance images and a position of the papillary muscle tips in the subset of closed instance images;
  for at least one predefined zone of each leaflet of the mitral valve, determine a corresponding open position in the mesh of the open mitral valve, and a corresponding closed position in the mesh of the closed mitral valve;
  derive a first chordae geometry, based on the identified position of the papillary muscle tips in the subset of closed instance images and on the determined closed position of each predefined zone;
  deforming the first chordae geometry based on a result of comparing:
    the identified positions of the papillary muscle tips in the subset of open instance images and in the subset of closed instance images; and
    for each predefined zone, the corresponding determined open position and closed position,
    so as to obtain a deformed chordae geometry.

According to other advantageous aspects of the invention, the system comprises a graphical user interface (GUI) communicating with the at least one processing unit.

In one embodiment, the at least one processing unit is further configured to receive from the user through the GUI, one or more of the following, taken alone or in any possible combination:
  a selection of a subset of open instance images in the sequence of echography images, the subset of open instance images comprising the mitral valve apparatus;
  a subset of closed instance images in the sequence of echography images, the subset of closed instance images comprising the mitral valve apparatus
  at least one target landmark in the subset of closed instance images;
  at least two reference landmarks in the subset of open instance images;
  a region of interest including the lines that most closely fit a mitral valve leaflet in the subset of open instance images;
  in the subset of open instance images, a first point on a first side of the mitral valve apparatus and a second point on a second side of the mitral valve apparatus, wherein the first side of the mitral valve apparatus and the second side of the mitral valve apparatus are separated by the mitral valve annulus;
  in the subset of open instance images, a first region of interest on the first side of the mitral valve apparatus and a second region of interest on the second side of the mitral valve apparatus.

In the context of the present invention, the following expressions have the following meanings:
  "mitral valve apparatus" refers to the anterior and posterior mitral valve leaflets, the papillary muscles tips, the annulus and the chordae tendineae.
  "closed instance image" refers to an image of the mitral valve apparatus acquired during peak systole.

"open instance image" refers to an image of the mitral valve apparatus acquired during end diastole.

"partly open" refers to an open instance image acquired at an instant of time following the isovolumic relaxation and preceding the end-diastole.

"fully open" refers to an open instance image acquired at the end-diastole.

The term "processing unit" should not be construed to be restricted to hardware capable of executing software, and refers in a general way to a processing device, which can for example include a computer, a microprocessor, an integrated circuit, or a programmable logic device (PLD). The processing unit may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

BRIEF DESCRIPTION OF THE DRAWINGS

The invention will be better understood with the attached figures, in which.

DETAILED DESCRIPTION

The following detailed description will be better understood when read in conjunction with the drawings. For the purpose of illustrating, the invention is shown in the preferred embodiments. It should be understood, however that the application is not limited to the precise arrangements, structures, features, embodiments, and aspect shown. The drawings are not drawn to scale and are not intended to limit the scope of the claims to the embodiments depicted. Accordingly, it should be understood that where features mentioned in the appended claims are followed by reference signs, such signs are included solely for the purpose of enhancing the intelligibility of the claims and are in no way limiting on the scope of the claims.

The System

Figure 1:
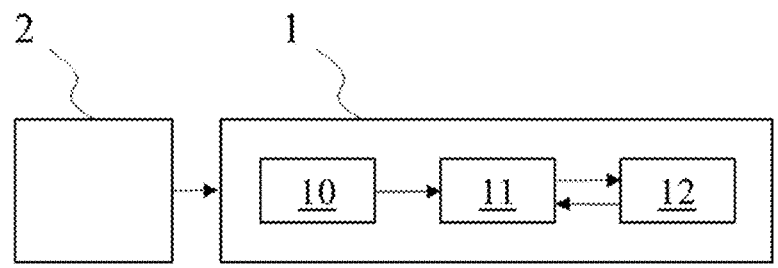
FIG. 1 is a schematic representation of a system 1 of the present invention.

A system 1 for reconstructing a geometry of the mitral valve of a subject according to the invention is shown on FIG. 1.

More precisely, the system 1 is configured to reconstruct a geometry of the mitral valve as open and as closed, on the basis of a sequence of echography images acquired from the subject.

Figures 2A, 2B:
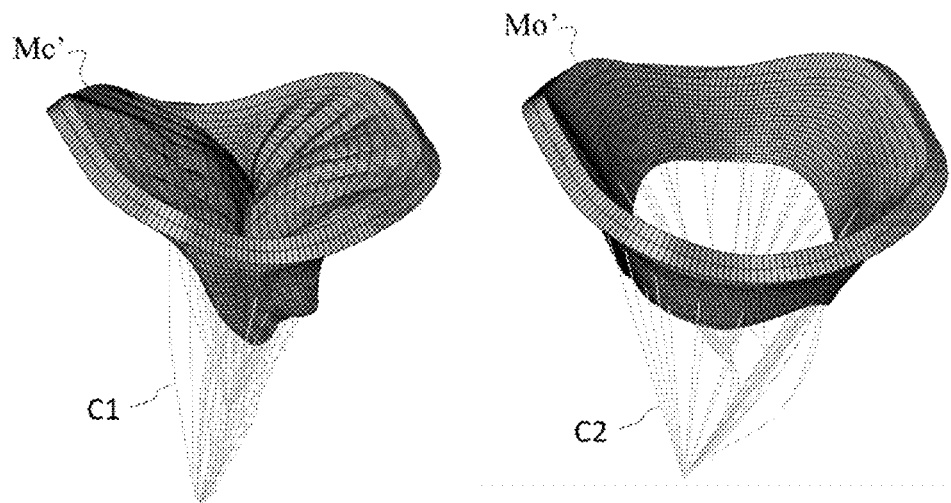
FIGS. 2A and 2B represent a 3D representation of an updated mesh of the closed mitral valve Mc' (2A) and an updated mesh of the open mitral valve Mo' (2B)

An example of the reconstructed geometry of the mitral valve as closed is shown on FIG. 2A. Said reconstructed geometry of the mitral valve as closed comprises an updated mesh of the closed mitral valve Mc' and a first chordae geometry C1.

Moreover, an example of the reconstruct geometry of the mitral valve as open is shown on FIG. 2B. Said reconstructed geometry of the mitral valve as open comprises an updated mesh of the open mitral valve Mo' and a deformed chordae geometry C2.

The updated mesh of the closed mitral valve Mc', the updated mesh of the open mitral valve Mo', the first chordae geometry C1 and the deformed chordae geometry C2 will be later described.

In particular, the system 1 is configured to reconstruct the geometry of the mitral valve chordae C1, C2 when the valve is in a closed open and in an open configuration respectively, on the basis of the acquired sequence of echography images acquired from the subject.

The system 1 comprises an acquisition device 10 and a processing unit 11, the acquisition device 10 being connected to an input of the processing unit 11. Preferably, the system 1 further comprises a graphical user interface (GUI) 12 connected to the processing unit 11.

In FIG. 1, an imaging apparatus 2, which is external to the system 1, is also illustrated. The imaging apparatus 2 is configured to acquire the sequence of echography images. For instance, the imaging apparatus 2 is configured to acquire the sequence of echography images pre-operatively or intra-operatively.

The system 1 will further be described with reference to FIG. 3. More precisely, the acquisition unit is configured to perform a reception step S10. Furthermore, the processing unit 11 is configured to perform each of: a selection step S20, a mesh generation step S30, a papillary muscle (PM) identification step S40, a derivation step S50 (for deriving the first chordae geometry C1) and a deformation step S60 (for generating the deformed chordae geometry C2).

Preferably, the processing unit 11 is further configured to perform a first insertion step S70 and a second insertion step S80 (for inserting the chordae geometries C1, C2 in the meshes).

Image Reception (S10)

The acquisition device 10 is configured to receive the sequence of medical images acquired by the imaging apparatus 2, the sequence of medical images representing the mitral valve and its apparatus during at least one heart cycle. Furthermore, the processing unit 11 is configured to compute the geometry of the mitral valve based on the sequence of medical images received by the acquisition device 10.

More precisely, the acquisition device 10 is configured to receive, during a reception step S10, the sequence of echography images previously acquired by the imaging apparatus 2, the sequence of echography images representing the mitral valve apparatus during at least one heart cycle.

Preferably, the echography images of the sequence are acquired during more than one heart cycles, preferably, during less than ten heart cycles, advantageously less than five heart cycles.

Advantageously, the sequence of echography images comprises three-dimensional echography images acquired at regular time intervals during at least one heart cycle.

Thus, it is possible to store the sequence of echography images in a file of small size, and to reduce the computational load.

The received sequence of echography image is, for instance, be displayed on the GUI 12.

Subset Selection (S20)

During the selection step S20, the processing unit 11 is configured to select a subset of open instance images So and a subset of closed instance images Sc in the received sequence of echography images.

By "subset of open instance images" So, it is meant images of the mitral valve apparatus acquired during end diastole. Thus, in the subset of open instance images So, the mitral valve may be fully open or partly open.

By "subset of closed instance images" Sc, it is meant images of the mitral valve apparatus acquired during peak systole. Thus, in the subset of closed instance images Sc, the mitral valve is fully closed.

Preferably, the processing unit 11 is further configured to pre-process the selected subsets of open and closed instance images So, Sc, if needed. The pre-processing step may comprise: denoising, filtering, features contrast enhancement.

Preferably, the processing unit 11 achieves the selection of the subsets of open and closed instance images So, Sc by running a selection algorithm. For instance, the selection algorithm is a machine learning or deep learning algorithm.

Alternatively, the processing unit 11 performs said selection based on inputs provided by the user via the GUI 12.

In another embodiment, the selection step S20 may be performed outside of the system 1. In this case, the acquisition device 10 receives, during the reception step S10, the subset of images So, Sc previously selected, without receiving the whole sequence of echography images.

Preferably, each subset of images So, Sc comprises one echography image. Indeed, in most cases it can be assumed that consecutive heart cycles are identical, therefore it is sufficient to select one echography image So in which the mitral valve is open, and one echography image Sc in which the mitral valve is closed. This allows to reduce the computational load and the time required for the next steps of the method, such as segmentation, while avoiding the introduction of average errors.

Alternatively, said subsets Sc, So comprise any suitable number open instance images So and/or closed instance images Sc. For instance, each subset So, Sc may comprise two or more echography images. In this case, the processing unit 11 is configured to combine them in an averaging step or any other suitable image combination step, so as to obtain one image representing the mitral valve as open and one image representing the mitral valve as closed, respectively.

Preferably, the echography images are three-dimensional images. Accordingly, the subset of open instance images So and the subset of closed instance images Sc are also three-dimensional. In this case, the processing unit 11 may be configured to sample, during an optional sampling step S21, a set of planes intersecting the subsets of images So, Sc. Thus, the intersections between said planes and the subsets of images So, Sc are bidimensional sections, i.e., slices of the subsets of images So, Sc, and one or more steps performed by the processing unit 11 may be repeated on each section. In this case, the processing unit is configured to perform the mesh generation step S30 and/or the PM identification step S40 based on each bidimensional section.

Description of the sampling step S21 is provided below.

Alternatively, the echography images are two-dimensional images. Accordingly, the subset of open instance images So and the subset of closed instance images Sc are also two-dimensional.

Preferably, the selected subsets of images So, Sc are displayed on the GUI 12.

Sampling Step (S21)

Preferably, in order to obtain the sampled sections mentioned above, the processing unit 11 is configured to, during step S21:
- define S211 a longitudinal axis in the subset of open instance images So or in the subset of closed instance images Sc;
- derive S212 the sheaf of planes about the longitudinal axis;
- sample S213, from the sheaf, a set of planes spaced about the longitudinal axis.

Thus, the sections are the intersections between the sampled planes and the subset of images So, Sc.

Advantageously, the set of planes are evenly spaced about the longitudinal axis. By "evenly spaced", it is meant that the angular distance between two adjacent planes is constant.

Preferably, the planes are separated by an angular distance comprised between 1° and 30°, more preferably between 5° and 15°.

Advantageously, the angular distance may be equal to 10°. In this case, the set of planes comprises 18 planes.

This angular distance is small enough to improve the accuracy of the mesh of the mitral valve and large enough to avoid information redundancy, which is advantageous. This allows to obtain a geometry of the mitral valve which reproduces the real mitral valve anatomy with fidelity, while reducing the computational load.

Therefore, there is no need to make a priori assumptions regarding the dimensions of the mitral valve leaflets. This reduces the risk of error and the time needed to perform the method.

Advantageously, selecting the bidimensional sections based on the sheaf of planes about the longitudinal axis, ensures that the mitral valve leaflets are entirely comprised in the sections obtained intersecting the sampled planes and the subset of closed or open instance images So, Sc.

However, it should be noted that other criteria may be used to select the bidimensional sections in the sampling step S21. For instance, it is possible to sample a predefined number of planes from a series of parallel planes. In this case, there is a risk that some portions of the mitral valve leaflets do not intersect with the planes. Accordingly, such portions will not be present in the sections obtained by intersecting the planes and the subset of images So, Sc. Therefore, some assumptions regarding the dimensions of the leaflets and/or iterative corrections may be needed.

Mesh Generation Step S30

The processing unit 11 is further configured to generate, during step S30, a mesh of the closed mitral valve Mc.

Figure 4:
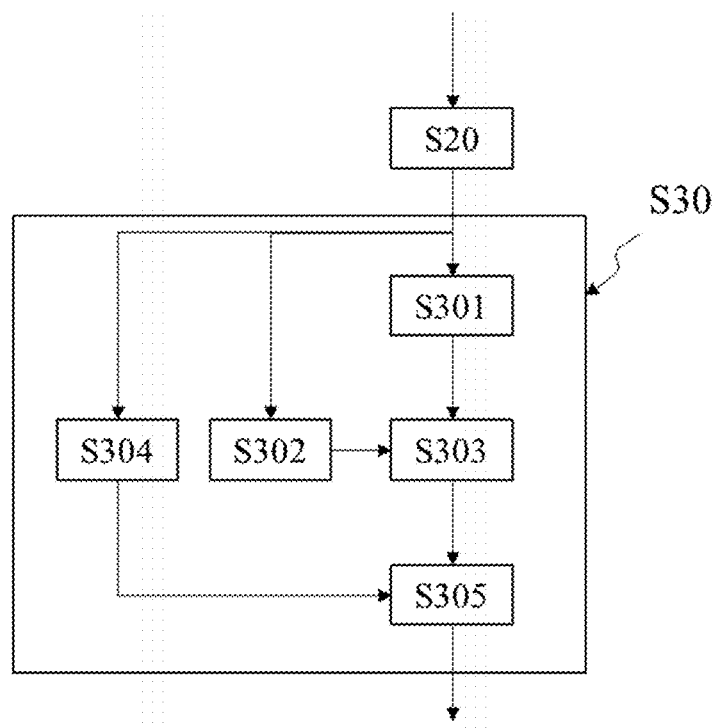
FIG. 4 is a flowchart representing the steps S20 and S30 of the method of FIG. 3.

As shown on FIG. 4, the mesh generation step S30 comprises two landmark selection steps S301, S302, a derivation step S303 (for deriving the landmarks' positions), a first mesh generation step S304 (for generating the mesh of the open mitral valve Mo) and a second mesh generation step S305 (for generating the mesh of the closed mitral valve Mc).

Landmark Selection (S301, S302)

The processing unit 11 is configured to select, during step S301, respectively during step S302, at least one target landmark Lc in the subset of images Sc, respectively at least two reference landmarks Lo in the subset of images So, if the subsets Sc, So are bidimensional images.

Figure 5:
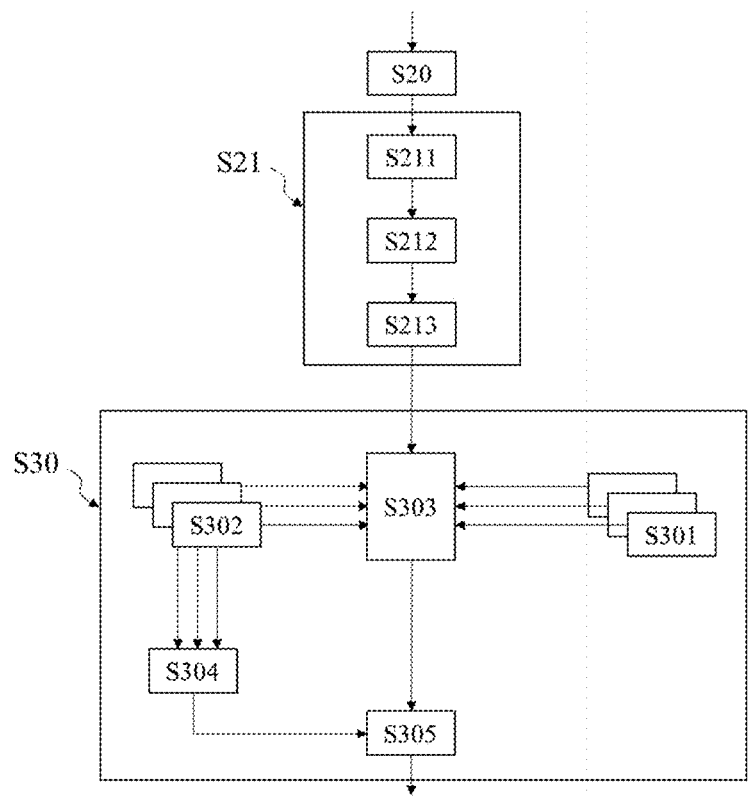
FIG. 5 is a flowchart representing the steps S20 and S30 of the method of FIG. 3.

Alternatively, if the subsets Sc, So are tridimensional images, the landmark selections steps 301, 302 are performed on each section obtained in the sampling step S21, as shown in FIG. 5. In the illustrated example, three planes are sampled from a sheaf of planes in step S213, therefore, three bidimensional sections of each subset So, Sc are obtained. Accordingly, steps 301 and S302 are performed by the processing unit 11 on each of the three obtained sections.

Preferably, the reference and target landmarks Lo, Lc are points.

The reference landmarks Lo and/or target landmark Lc may be displayed on the GUI 12. For instance, they may be displayed as overlapped to subset of images So, Sc from which they are derived, as shown in FIG. 6B and FIG. 7B.

In order to reconstruct the chordae geometries C1, C2, and/or the mitral valve geometries Mo', Mc', the reference and target landmarks Lo, Lc need to be overlapped with the mitral valve apparatus, i.e., they lie on at least one of: the anterior or the posterior mitral valve leaflet, the papillary muscles tips, the annulus, the chordae tendineae. Preferably, the landmarks Lo, Lc lie on the mitral valve leaflets.

The landmarks Lo, Lc may be derived by the processing unit 11. Alternatively, the landmarks Lo, Lc are defined by a user, via the GUI 12. In this case, the processing unit 11 is configured to select the landmarks Lo, Lc based on the user-defined landmarks Lo, Lc.

Alternatively, at least one landmark selection step S301, S302 is semi-automated. For instance, some landmarks Lo, Lc may be defined by the user via the GUI 12, then the landmark selection may be validated or modified by the processing unit 11, or vice-versa, as needed.

In this case, the processing unit 11 is advantageously configured to perform a quality control step.

For instance, if a first landmark selection is performed by the user, the processing unit 11 may verify whether the number of landmarks Lc and Lo is the same. If that is not the case, the processing unit 11 may interpolate some of the user-defined landmarks Lo, Lc to obtain an equal number of landmarks Lo, Lc.

In another example, if the first landmark selection is performed by the processing unit 11, then the user may modify and/or validate said selection. For instance, the landmarks Lo, Lc may be displayed on the GUI 12 and the user may modify their respective positions via a drag-and-drop tool, or he/she may remove some landmarks Lo, Lc via the GUI 12, as needed.

Target landmarks Lc selection (S301)

Each target landmark Lc may be one of:
i. a point lying on the coaptation line between the mitral valve leaflets;
ii. a point at the first extremity of the anterior mitral valve leaflet;
iii. a point at the first extremity of the posterior mitral valve leaflet;
iv. a point at the second extremity of the anterior mitral valve leaflet;
v. a point at the second extremity of the posterior mitral valve leaflet;
vi. a point which is in common to the second extremity of the anterior mitral valve leaflet and the second extremity of the posterior mitral valve leaflet.

For instance, the first extremities are the margins of the anterior and posterior leaflets attached to the annulus, and the second extremities are the free margins of the anterior and posterior leaflets.

Figure 6:
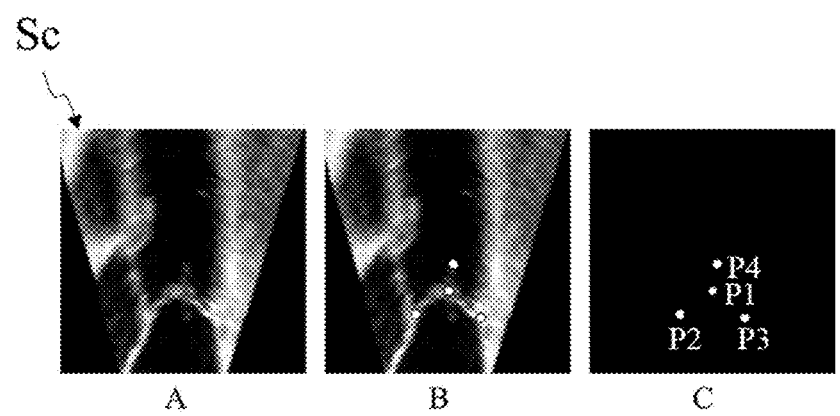
FIG. 6 includes (A) an image showing a section of a three-dimensional closed instance image Sc obtained by intersecting said closed instance image Sc with a sagittal plane of a subject, (B) an image showing four target landmarks Lc which are represented as overlapped to the section of A, and (C) an image in which the four target landmarks Lc are better shown.

In the example of FIG. 6, four landmarks Lc are shown, having respectively references P1 to P4 and belonging respectively to categories (i), (ii), (iii) and (vi).

As aforementioned, the processing unit 11 is configured to generate, during step S30, a mesh of the closed mitral valve Mc which is based on the landmarks Lc described hereabove. Therefore, selecting, during step S301, the target landmarks Lc so that they lie on the coaptation line is particularly advantageous. Indeed, this ensures that the mesh of the closed mitral valve Mc will accurately reproduce the mitral valve coaptation zone.

Reference Landmarks Lo Selection (S302)

As aforementioned, at least two reference landmarks Lo are selected in the subset of open instance images So.

The at least two landmarks preferably comprise at least one landmark Lo which lies on the anterior mitral valve leaflet, and at least one landmark Lo lies on the posterior mitral valve leaflet. Advantageously, having the reference landmarks Lo distributed on both the anterior and posterior mitral valve leaflets ensures that both the leaflets will be present in the three-dimensional reconstruction of the mitral valve.

Figure 7:
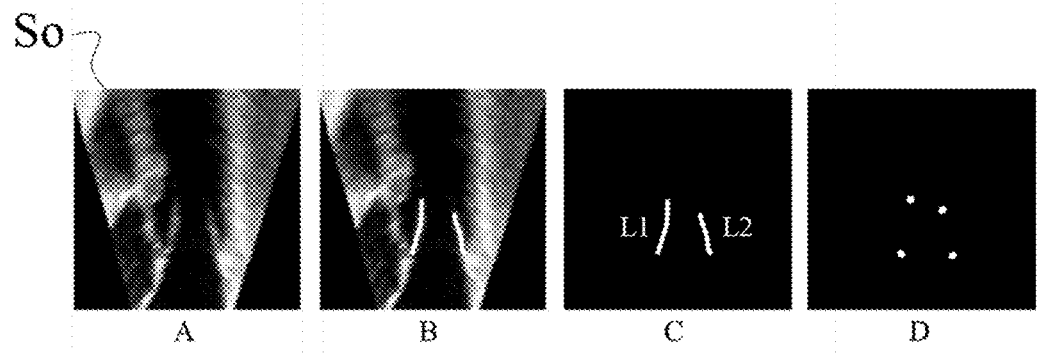
FIG. 7 includes (A) an image showing a section of a three-dimensional open instance image So obtained by intersecting said open instance image So with a sagittal plane of a subject, (B) an image showing the two lines L1, L2 the most closely fit the profile of the leaflets, overlapped to the section of A, (C) an image in which the two lines L1, L2 are better shown, and (D) an image in which the endpoints of the lines L1, L2 are shown.

The reference landmarks Lo may be derived by the processing unit 11 on the basis of one or more lines L1, L2, as shown in FIG. 7. In this example, said lines are two lines L1, L2 that approximate the mitral valve leaflets' profiles. The lines L1, L2 that approximate the mitral valve leaflets' profiles may be derived by the processing unit 11. Alternatively, said lines L1, L2 are defined by a user, via the GUI 12. In this case, the processing unit 11 is configured to select the reference landmarks Lo based on the user-defined lines L1, L2. For instance, the endpoints of said lines L1, L2 may be selected as reference landmarks Lo, as shown in FIG. 7D. This allows to select, as reference landmarks Lo, points lying on the mitral valve leaflets' margins.

In this example above, the landmark selection steps S301, S302 may be independent.

Alternatively, one of the landmark selection steps S301, S302 may depend on the other one. Preferably, one or more reference landmarks Lo may be selected on the basis of the target landmarks Lc.

For instance, the processing unit 11 may perform the followings:
- selecting during the landmark selection step S301, in the subset of closed instance images Sc, the points P1, P2, and P3 described hereabove;
- calculating a first distance d12 between P1 and P2, and a second distance d13 between P1 and P3;
- identifying, on the subset of open instance images So, the two lines L1, L2 that most closely fit the anterior and posterior mitral valve leaflets, each of said lines L1, L2 having a first endpoint on the leaflet margin attached to the annulus, and a second endpoint on the free margin of the leaflet;
- selecting S302 as reference landmarks Lo, one point on each line L1, L2, said points having a distance from the first line endpoints which is equal to the first distance d12 and the second distance d13, respectively.

As aforementioned, the processing unit 11 may be configured to select, during step S301, at least one target landmark Lc lying on the coaptation line. In this case, selecting one or more reference landmarks Lo during step S302 on the basis of said target landmark Lc is particularly advantageous.

Indeed, the coaptation line is only present in the closed instance images Sc. During the valve opening, the position of the points lying on the coaptation line progressively changes. When the mitral valve is open, the two leaflets are separated by a gap, hence the coaptation line is not present. In some situations, it may be desirable to identify in the open instance images So which are the points that would lie on the coaptation line when the valve is closed, for instance for performing the step S305 of generating the mesh of the closed mitral valve Mc, described further below. In these situations, by selecting on each line L1, L2 the points having a distance from the first line endpoints that is equal to d12 or d13 mentioned hereabove, it is possible to identify on the open valve the points that would lie on the coaptation line when the valve is closed.

Landmark Position Derivation (S303)

The processing unit 11 is configured to derive, during step S303, the positions of said landmarks Lo, Lc in a predetermined reference frame.

Preferably, the positions are the coordinates in a three-dimensional coordinate axis system. For instance, the positions are polar coordinates, or cartesian coordinates.

Preferably, the reference frame comprises a longitudinal axis obtained by the processing unit 11 via the following steps:
- defining, in the subset of open instance images So or in the subset of closed instance images Sc, a first point on a first side of the mitral valve apparatus;
- defining, in the subset of open instance images So or in the subset of closed instance images Sc, a second point on a second side of the mitral valve apparatus;
- joining the first point and the second point, so as to obtain the longitudinal axis.

In this case, the first side of the mitral valve apparatus and the second side of the mitral valve apparatus are separated by the mitral valve annulus.

Preferably, the first and second points are defined in the subset of open instance images So.

This allows to obtain an axis that does not intersect the mitral valve leaflets, thereby facilitating the reconstruction of the geometry of the mitral valve leaflets.

Alternatively, said first and second points are obtained as follows:
- defining, in the subset of open instance images So or in the subset of closed instance images Sc, a first region of interest (ROI) on the first side of the mitral valve apparatus;
- defining, in the subset of open instance images So or in the subset of closed instance images Sc, a second ROI on the second side of the mitral valve apparatus;
- selecting as first point the center of the first ROI and as second point the center of the second ROI.

Preferably, the first and second ROIs are defined in the subset of open instance images So.

For instance, the first and second ROIs are polygons or ellipses. In this case, each ROI may approximate a heart chamber.

In one embodiment, the center of the first and second ROIs may be the symmetry center, the center of mass, the weighted center of mass, or the center of bounding box/ellipsoid.

The first and second ROIs are defined by a user via the GUI 12 or defined by the processing unit 11.

Since the first side of the mitral valve apparatus and the second side of the mitral valve apparatus are separated by the mitral valve annulus, the first and the second points are not in the same heart chamber. Therefore, it is possible to obtain a longitudinal axis which is close to the longitudinal axis of the left hearth.

Said longitudinal axis may be the same axis used to define the sheaf of planes described above.

Generation of the Open Mesh Mo (S304)

In addition to the landmark selection steps described hereabove, the processing unit 11 is further configured to generate, during a step 304, a mesh of the open mitral valve Mo.

Figure 8:
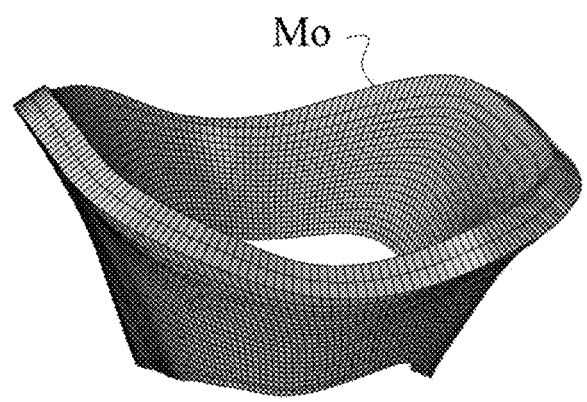
FIG. 8 is a 3D representation of a mesh of the open mitral valve Mo computed using the method of FIG. 3.

An example of the mesh of the open mitral valve Mo is shown on FIG. 8. This mesh Mo comprises hexahedral elements.

Preferably, during the step 304, the processing unit 11 generates the mesh of the open mitral valve Mo by:
- tracking the profile of the mitral valve leaflets in a plurality of bidimensional sections of the open instance images So;
- reconstructing a leaflets' surface from the tracked profiles; and
- generating the mesh of the open mitral valve Mo on the basis of the leaflets' surface.

The tracking of the leaflet profile in one section from the plurality is shown on FIG. 7. In this example, the tracking of the leaflet profile and the reference landmarks Lo selection are performed by the processing unit 11 on the same section, shown in FIGS. 7A and 7B. The profiles thus obtained can then be used to reconstruct the leaflets' surface which, in turn, is used to generate the mesh of the open mitral valve Mo in step S304.

The step S304 of generating the mesh of the open mitral valve Mo, may be independent from the previous landmark selection steps S301, S302.

Alternatively, step S304 may depend on at least one landmark selection steps S301, S302. Preferably, the mesh of the open mitral valve Mo is generated in step S304 on the basis of the reference landmarks Lo, as shown in FIG. 7. In this example, the processing unit 11 derives a plurality of bidimensional sections of the subset of open instance images So; one section of said plurality is shown in FIG. 7A. Then, on each section, the processing unit 11 performs the following steps:

tracking the mitral valve leaflet profile by identifying the two lines L1, L2 that most closely fit the mitral valve leaflets, as shown in FIGS. 7B and 7C;

selecting, as reference landmarks Lo, the endpoints of said two lines L1, L2, as shown in FIG. 7D;

optionally, in addition to the endpoints, further points may be selected on the two lines L1, L2.

As aforementioned, the two lines L1, L2 may be defined by a user via the GUI 12. In this case, the processing unit 11 may be configured to receive an input signal from an input device interacting with the GUI 12, such as a keyboard, or a mouse. Preferably, the input signal is representative of two distinct sequences of points, and the processing unit 11 is configured to interpolate said two sequences of points, so as to obtain two lines L1, L2.

For instance, the two sequences of points may be interpolated with a linear function, polynomial function (such as a spline function), exponential function, logarithmic function, or power function.

Tracking the lines L1, L2 on all the bidimensional sections, allows to obtain a plurality of mitral valve leaflets' profiles. The processing unit 11 is further configured to generate, in step S304, the mesh of the open mitral valve Mo based on said plurality of mitral valve leaflet profiles.

For example, the processing unit 11 may generate the mesh of the open mitral valve Mo via Delaunay triangulation, grid-based techniques, or any other mesh generation technique known by a person skilled in the art.

Figures 9A, 9B:
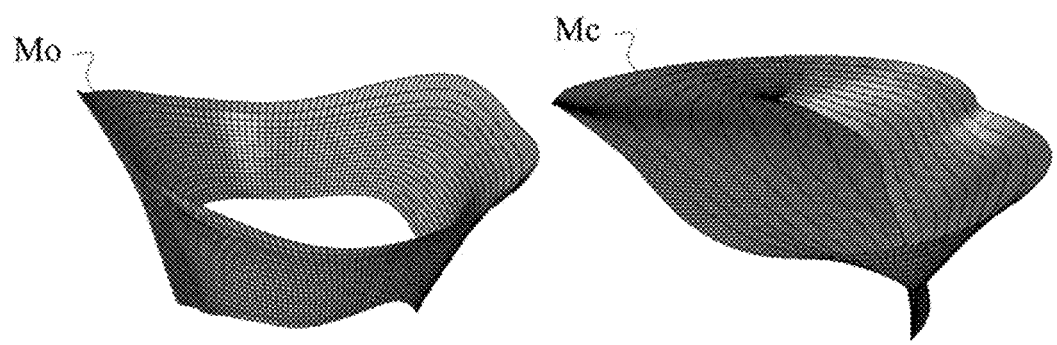
FIG. 9A is another 3D representation of the mesh of FIG. 8.
FIG. 9B is a 3D representation of a mesh of the closed mitral valve Mc computed using the method of FIG. 3 based on the mesh of the open mitral valve Mo of FIG. 9A.

One example of the mesh of the open mitral valve Mo generated in step S304 is shown in FIG. 9A. In this example, the mesh Mo comprises shell elements. Alternatively, the mesh Mo may comprise hexahedral, quadratic (i.e., quadrilateral) or triangular meshes. For instance, hexahedral element meshes may be obtained by adding a predefined thickness to the shell elements. Preferably, in the case of quadrilateral and/or hexahedral elements, the fiber directions are parallel to the sides of said elements.

The mesh of the open mitral valve Mo may further be displayed on the GUI 12.

Generation of the Closed Mesh Mc (S305)

The processing unit 11 is further configured to generate, during step S305, a mesh of the closed mitral valve Mc.

Preferably, after generating the mesh of the open mitral valve Mo in step S304, and deriving the positions of the landmarks Lo, Lc in step S303, the processing unit 11 is configured to generate the mesh of the closed mitral valve Mc by morphing the mesh of the open mitral valve Mo on the position of the reference landmarks Lo and the target landmark Lc, in step S305.

As aforementioned, the number of target and reference landmarks Lc, Lo may be the same.

This ensures that there is a bijection relationship between target landmarks Lc and the reference landmarks Lo, before performing generating S305 the mesh of the closed mitral valve Mc.

Alternatively, the number of target and reference landmarks Lc, Lo is not equal and the processing unit 11 does not balance it. This embodiment allows to use, in the generation step S305, morphing algorithms that do not require the same number of target and reference landmarks Lc, Lo.

Moreover, if the number of reference and target landmarks Lo, Lc is not equal and the processing unit 11 does not balance it, morphing algorithms that require a bijection relationship between reference and target landmarks Lo, Lc may also be used. In this case, the processing unit 11 may use a particular landmark more than once, i.e., a reference landmark Lo can have two or more corresponding target landmarks Lc in said morphing step, or vice versa. Preferably, the landmarks to be used more than once are selected by the user via the GUI 12.

Advantageously, the processing unit 11 may be configured to associate a target landmark Lc lying on the coaptation line (such as the point P1 shown in FIG. 6C) to two reference landmarks Lo obtained by the processing unit 11 on the basis of the distances d12 and d13 described above. This ensures that the landmark correspondence, during the generation step S305, is anatomically meaningful. Indeed, the positions of the reference landmarks Lo obtained on the basis of d12 and d13 correspond to the position that the point P1 would have when the valve is open.

FIG. 9B illustrates an example of the mesh of the closed mitral valve Mc generated in step S305. In this example, the mesh Mc comprises shell elements. Alternatively, the mesh Mc may comprise hexahedral, quadratic or triangular meshes. For instance, hexahedral element meshes may be obtained by adding a predefined thickness to the shell elements.

The mesh of the closed mitral valve Mc may further be displayed on the GUI 12.

PM Identification (S40)

As aforementioned, the processing unit 11 is configured to identify, during step S40, the positions of the PM tips in the subset of open instance images So and in the subset of closed instance images Sc.

For instance, the positions of the PM tips are identified on the plurality of bidimensional sections described hereabove.

Preferably, said positions of the PM tips are displayed on the GUI 12. For instance, they are displayed as overlapped to the subsets of open and closed instance images So, Sc.

In one embodiment, these positions are the coordinates in a three-dimensional coordinate axis system described hereabove.

Deriving a Predefined Zone on Each Leaflet

The processing unit 11 is further configured to identify at least one predefined zone of each leaflet of the mitral valve.

Preferably, each predefined zone is located at a respective predetermined distance from a corresponding leaflet boundary.

By "leaflet boundary" it is meant the free edge of the leaflets, or the basal edge (i.e., the edge which is attached to annulus) of a mitral valve leaflet. The anterior leaflet boundary and posterior leaflet boundary from the leaflets' boundaries.

More precisely, for each predefined zone of each leaflet of the mitral valve, the processing unit 11 is configured to determine (S41) a corresponding open position in the mesh of the open mitral valve (Mo), and a corresponding closed position in the mesh of the closed mitral valve (Mc).

Preferably, said predetermined zone of a mitral valve leaflet is displayed on the GUI 12. For instance, it is displayed as overlapped to the mesh of the open mitral valve Mo and/or to the mesh of the closed mitral valve Mc.

Preferably, each predefined zone is located on a middle plane of each leaflet of the mitral valve. Said middle plane is preferably obtained by:

selecting at least one point on each section of the subset of closed instance images Sc obtained in the sampling step S21;

interpolating the selected points so as to obtain a middle plane of each leaflet of the mitral valve.

Derivation of the 1st Chordae Geometry (S50)

On the basis of the positions of the PM tips and on the determined closed position of each predefined zone, the processing unit 11 is configured to derive, during step S50, a first chordae geometry C1.

For instance, the processing unit 11 may be configured to, during step S50:
- reconstruct S501 a geometry of the mitral valve leaflets;
- identify S502 leaflets' boundaries on the reconstructed geometry of the mitral valve leaflets.

The geometry of the mitral valve leaflets may be the middle plane of each leaflet of the mitral valve, as described hereabove.

Alternatively, step S50 does not comprise the reconstruction S501 of the geometry of the mitral valve leaflets. In this case, the geometry of the mitral valve leaflets in which the leaflets' boundaries are identified (S502) may be the mesh of the closed mitral valve Mc previously obtained during the generation step S304.

Figure 10:
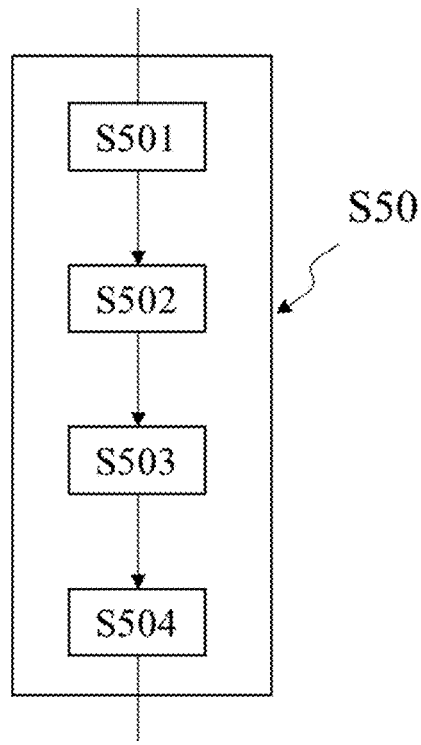
FIG. 10 is a flowchart representing the step S50 of the method of FIG. 3.

Preferably, as shown on FIG. 10, the processing unit 11 is further configured to, during step S50:
- distributing S503, in the mesh of the closed mitral valve (Mc), first and second chordae extremities:
  - each first chordae extremity being located at a corresponding position of the identified positions of the PM tips;
  - each second chordae extremity being located at the closed position of the respective predefined zone;
- for each chordae of the first chordae geometry (C1), deriving S504 an associated chordae length as the distance between the first and second chordae extremities, wherein each predefined zone is located at a respective predetermined distance from a corresponding leaflet boundary.

For instance, the processing unit 11 may be configured to reconstruct the first chordae geometry C1 as beam elements, each beam element connecting one first chordae extremity to one second chordae extremity, and having a length equal to the chordae length.

Advantageously, the first chordae geometry C1 thus obtained is representative of the anatomy of the loaded chordae.

Advantageously, on the basis of the predetermined distance from the leaflets' boundaries, it is possible to obtain a chordae geometry which is close to the geometry of the marginal chordae, the basal chordae and/or the strut chordae of the subject.

For instance, the predetermined distance from the leaflets' boundaries may be equal to zero. In this case, the second chordae extremities lie on the leaflets' boundaries. Accordingly, the second chordae extremities are distributed on the leaflets' basal edge, or on the leaflets' free edge.

Advantageously, by distributing the first chordae extremities on the positions of the PM tips, and the second chordae extremities on the leaflets' free edge, it is possible to obtain a chordae geometry which is close to the geometry of the marginal chordae of the subject.

In this case, the number M of second chordae extremities which lie on the leaflets' boundaries is preferably comprised between 30 and 60, advantageously between 40 and 56.

More preferably, 24 first chordae extremities are evenly distributed on the position of the papillary muscle and 48 second chordae extremities on the leaflet's free edge.

Alternatively, or in combination, for at least part of the chordae, the predetermined distance from the leaflets' boundaries distance may be nonzero. In this case, the corresponding second chordae extremities do not lie on the leaflets' boundaries. More precisely, in this case, the corresponding second chordae extremities lie at a first distance d1 from the leaflets' free edge and a second distance d2 from the leaflets' basal edge.

In this case, the number M is equal to the sum of the number of second chordae extremities which lie on the leaflets' boundaries and the number M' of second chordae extremities which are at a nonzero distance from the leaflets' boundaries.

In this case, the number M' of second chordae extremities which are at a nonzero distance from the leaflets' boundaries is preferably comprised between 4 and 30, advantageously between 10 and 20. This number is representative of the sum of the number of strut chordae and the number of basal chordae in humans.

Advantageously, if d1 is less than d2, it is possible to obtain a chordae geometry which is close to the geometry of ae strut chordae of the subject.

In this case, d1 is preferably comprised between 5 mm and 10 mm.

Advantageously, if d1 is greater than d2, it is possible to obtain a chordae geometry which is close to the geometry of a basal chordae of the subject. Indeed, the basal chordae originate on the basal part (i.e., close to annulus) of the leaflets.

In this case, d2 is preferably comprised between 5 mm and 10 mm.

The first distance d1 and the second distance d2 may vary among the second chordae extremities which are at a nonzero distance from the leaflets' boundaries.

For instance, the processing unit 11 may be configured to determine a leaflet length, and to calculate d1 and/or d2 based on the leaflet length.

The geometry of the mitral valve leaflets is a three-dimensional curved surface. It may be obtained for instance by interpolating some points selected on the subsets of images Sc. These points may comprise the target landmarks Lc described above.

Preferably, the processing unit 11 is configured to reconstruct S501 the geometry of the mitral valve leaflets based on the mesh of the closed mitral valve Mc.

Preferably, the number N of first chordae extremities which are distributed on the positions of the PM tips is comprised between 15 and 45, advantageously between 20 and 38.

Preferably, the number M of second chordae extremities is superior to the number N of first chordae extremities.

Advantageously, having a number M of second extremities superior to the number N of first extremities allows to obtain a first chordae geometry C1 that is representative of the actual anatomy of chordae, as they comprise branches. For instance, the number M of second chordae extremities may be twice the number N of first chordae extremities. In this case, each one of the chordae comprises a main beam portion, which originates in one of the first chordae extremities, and two secondary beam portions, which branch off from the main beam portion, ending in two of the second chordae extremities.

For instance, the second chordae extremities may be distributed as follows:
- N/2 first chordae extremities are distributed on the anterolateral PM tips;
- N/2 first chordae extremities are distributed on the posteromedial PM tips;
- M/2 second chordae extremities are distributed on the anterior leaflet;

M/2 second chordae extremities are distributed on the posterior leaflet.

This example allows to obtain a first chordae geometry C1 that is representative of the marginal chordae of the subject.

Preferably, the chordae extremities are evenly spaced. More precisely, the second chordae extremities are evenly spaced in a circumferential direction on each posterior and anterior leaflet. Advantageously, this ensures that distance between two adjacent chordae extremities is larger than 0.5 mm, preferably larger than 1 mm. Therefore, the distance between two adjacent chordae is larger than the chord diameters as observed in humans.

Chordae Deformation (S60)

Furthermore, the processing unit 11 is configured to obtain, during step S60, a deformed chordae geometry C2.

More precisely, the processing unit 11 is configured to compare, in step S60:

the identified positions of the papillary muscle tips in the subset of open instance images So and in the subset of closed instance images Sc; and for each determined predefined zone, the corresponding open position and closed position, and to deform the first chordae geometry C1 based on a result of said comparison, so as to obtained a deformed chordae geometry C2.

Preferably, to deform the first chordae geometry C1, in order to obtain C2, the processing unit 11 is configured to:

displace the first chordae extremities from the position of the papillary muscle tips in the subset of closed instance images Sc to the position of the papillary muscle tips in the subset of open instance images So; and displace the second chordae extremities from the closed position of the predefined zone, to the open position of said predefined zone.

The deformed chordae geometry C2 thus obtained is representative of the anatomy of the chordae when the mitral valve is open or partly open.

The chordae deformation may be computed using finite element simulation, by applying as boundary conditions a displacement of the chordae extremities from a closed valve configuration to an open valve configuration, or by using any other mesh deformation technique known by a person skilled in the art, such as for instance by using a "As Rigid As Possible" algorithm.

For example, during finite element simulation, the chordae length may be kept constant.

Insertion of C1 to Mc to Obtain Mc' (S70)

Figure 3:
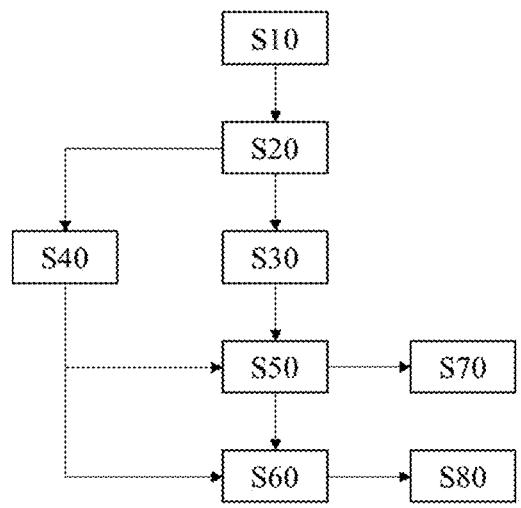
FIG. 3 is a flowchart representing a method for reconstructing a geometry of a mitral valve according to the invention.

As shown in FIG. 3, the processing unit 11 is advantageously further configured to insert the first chordae geometry C1 to the mesh of the closed mitral valve Mc in a step S70, so as to obtain an updated mesh of the closed mitral valve Mc'.

In this case, the updated mesh Mc' comprises a first chordae geometry C1 which is obtained based on the subset of images Sc. The insertion of the first chordae geometry C1 to the mesh of the closed mitral valve Mc performed by the processing unit 11 during step S70 may comprise: inserting beam elements joining the first and second chordae extremities and having a length equal to the chordae length.

FIG. 2A illustrates an example of updated mesh of closed mitral valve Mc' obtained during the insertion step S70. This mesh Mc' is made of hexahedral elements and linear elements. More precisely, it comprises a mitral valve leaflets' surface made of hexahedral elements, and a first chordae geometry C1 made of linear elements.

Insertion of C2 to Mo to Obtain Mo' (S80)

As shown in FIG. 3, the processing unit 11 is advantageously further configured to insert the deformed chordae geometry C2 to the mesh of the open mitral valve Mo is a step S80, so as to obtain an updated mesh of the open mitral valve Mo'.

In this case, the updated meshes Mo' comprises a deformed chordae geometry C2 which is obtained based on the subsets of images So, Sc. Indeed, the deformed chordae geometry C2 is derived from the positions of the PM tips in both the subsets of images So, Sc.

Therefore, the updated mesh of the closed mitral valve Mc' and the updated mesh of the open mitral valve Mo' obtained by the processing unit 11 in the insertion steps S70 and S80, provide an accurate reconstruction of the geometry of the mitral valve of the subject as closed and open, respectively.

Figure 11:
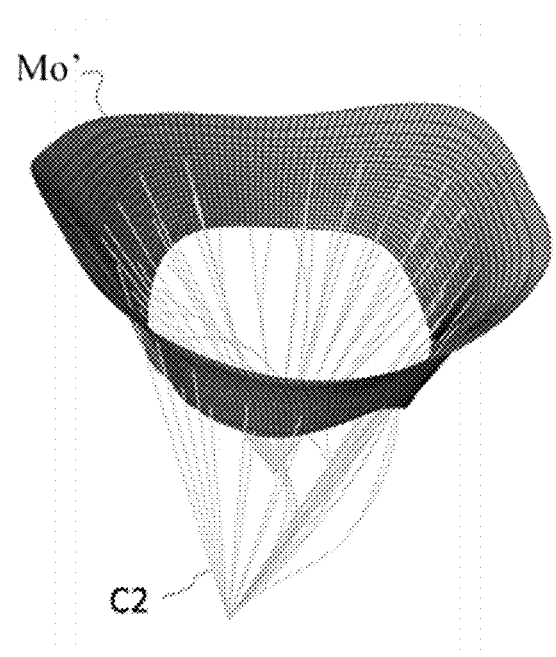
FIG. 11 is a 3D representation of an exemplary updated mesh of open mitral valve Mo' derived using the method of FIG. 3.

FIG. 11 illustrates one example of the updated mesh of open mitral valve Mo' obtained in the insertion step S80. In particular, the mesh Mo' of FIG. 11 is made of shell elements and linear elements.

The updated mesh of the closed mitral valve Mc' obtained in step S70 and/or the updated mesh of the open mitral valve Mo' obtained in the insertion step S80 may further be displayed on the GUI 12.

The Method

Operation of the system 1 will now be disclosed.

During step S10, the processing unit 11 receives a sequence of medical images previously acquired.

During step S20, the processing unit 11 selects, in the received sequence of echography images, a subset of open instance images So and a subset of closed instance images Sc.

Then, during step S30, the processing unit 11 generates a mesh of the closed mitral valve Mc based on the subset of closed instance images Sc.

Then, during step S40, the processing unit 11 identifies a position of the PM tips in the subset of open instance images So and in the subset of closed instance images Sc.

Then, during step S50, the processing unit 11 derives a first chordae geometry C1 from the mesh of the closed mitral valve Mc, based on the position of the PM tips in the subset of closed instance images Sc.

Then, during step S60, the processing unit 11 compares the positions of the papillary muscle tips in the subset of open instance images So and in the subset of closed instance images Sc, so as to obtain a deformed chordae geometry C2 based on the first chordae geometry C1.

Preferably, the processing unit 11 inserts during step S70, the first chordae geometry C1 to the mesh of the closed mitral valve Mc generated in step S30.

Preferably, the processing unit 11 inserts during step S80, the deformed chordae geometry C2 to the mesh of the open mitral valve Mo generated in step S304.

Computer Program

The present invention also relates to a computer program for reconstructing the geometry of the mitral valve of a subject as open and as closed, the computer program comprising program code instructions which, when executed by a computer, cause the computer to carry out the method according to any one of the embodiments described hereabove.

Computer programs implementing the method of the present embodiments can commonly be distributed to users on a distribution computer-readable storage medium such as, but not limited to, an SD card, an external storage device, a microchip, a flash memory device, a portable hard drive and software websites. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The instructions or software to control a processing unit or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processing unit or computer so that the processing unit or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processing unit or computer.

Storage Medium

The present invention also relates to a non-volatile computer storage medium comprising instructions which, when executed by a computer, cause the computer to carry out at least the steps S30, S50, S60 of the method according to the invention, and preferably all the steps of the method. Preferably, the computer-readable storage medium is a non-transitory computer-readable storage medium.

The invention claimed is:

1. A method for reconstructing a geometry of a mitral valve of a subject, based on a sequence of echography images acquired from the subject, the sequence of echography images representing the mitral valve apparatus during at least one heart cycle, the method comprising:
    generating a mesh of an open mitral valve based on a subset of open instance images in the sequence of echography images, and;
    generating a mesh of a closed mitral valve based on a subset of closed instance images in the sequence of echography images;
    identifying a position of papillary muscle tips of the subject in the subset of open instance images and a position of the papillary muscle tips in the subset of closed instance images;
    for at least one predefined zone of each leaflet of the mitral valve, determining a corresponding open position in the mesh of the open mitral valve, and a corresponding closed position in the mesh of the closed mitral valve;
    deriving a first chordae geometry, based on the identified position of the papillary muscle tips in the subset of closed instance images and on the determined closed position of each of the at least one predefined zone;
    deforming the first chordae geometry based on a result of comparing:
        the identified positions of the papillary muscle tips in the subset of open instance images and in the subset of closed instance images; and
        for each predefined zone, the corresponding determined open position and closed position,
    so as to obtain a deformed chordae geometry.

2. The method according to claim 1, further comprising inserting the first chordae geometry to the mesh of the closed mitral valve so as to obtain an updated mesh of the closed mitral valve, the updated mesh of the closed mitral valve being a reconstruction of the geometry of the mitral valve as closed.

3. The method according to claim 1, further comprising inserting the deformed chordae geometry to the mesh of the open mitral valve so as to obtain an updated mesh of the open mitral valve, the updated mesh of the open mitral valve being a reconstruction of the geometry of the mitral valve as open.

4. The method according to claim 1, wherein the mesh of the closed mitral valve is further generated based on the mesh of the open mitral valve.

5. The method according to claim 4, wherein generating the mesh of the closed mitral valve comprises:
    selecting at least one target landmark in the subset of closed instance images;
    selecting at least two reference landmarks in the subset of open instance images;
    deriving a position, in a predetermined reference frame, of the at least two reference landmarks and the at least one target landmark;
    morphing the mesh of the open mitral valve based on the position of the at least two reference landmarks and the at least one target landmark to generate the mesh of the closed mitral valve,
    wherein the at least one target landmark and the at least two reference landmarks lie on the mitral valve leaflets.

6. The method according to claim 5, wherein the at least one target landmark comprises a point lying on a coaptation line between the leaflets of the mitral valve.

7. The method according to claim 5, wherein selecting the at least two reference landmarks comprises:
    on the subset of open instance images, identifying the two lines that most closely fit the leaflets of the mitral valve;
    selecting, as the at least two reference landmarks, at least one point lying on each of said two lines.

8. The method according to claim 1, wherein deriving the first chordae geometry comprises:
    for each leaflet, identifying corresponding leaflet boundaries;
    distributing, in the mesh of the closed mitral valve, first and second chordae extremities:
        each first chordae extremity being located at a corresponding position of the identified positions of the papillary muscle tips;
        each second chordae extremity being located at the closed position of a respective predefined zone;
    for each chordae of the first chordae geometry, deriving an associated chordae length as a distance between the corresponding first and second chordae extremities,
    wherein each predefined zone is located at a respective predetermined distance from a corresponding leaflet boundary.

9. The method according to claim 8, further comprising:
defining a longitudinal axis in the subset of open instance images;
deriving a sheaf of planes about the longitudinal axis;
sampling, from the sheaf of planes, a set of planes spaced about the longitudinal axis, and intersecting said set of planes with the subset of closed instance images, so as to obtain sections of said subset of closed instance images;
selecting at least one point on each section;
interpolating the at least one selected point on each section, so as to obtain a middle plane of each leaflet of the mitral valve,
wherein each predefined zone is located on the obtained the middle plane.

10. The method according to claim 8, wherein N first chordae extremities are distributed on the position of the papillary muscle tips and M second chordae extremities are distributed at the closed position of the respective predefined zone, N and M being integers, M being greater than or equal to N.

11. The method according to claim 10, wherein N is comprised between 20 and 38.

12. The method according to claim 8, wherein inserting the first chordae geometry to the mesh of the closed mitral valve comprises inserting beam elements joining the first chordae extremities and the second chordae extremities.

13. The method according to claim 8, wherein deforming the first chordae geometry comprises:
displacing the first chordae extremities from the position of the papillary muscle tips in the subset of closed instance images to the position of the papillary muscle tips in the subset of open instance images;
displacing the second chordae extremities from the closed position of the predefined zone, to the open position of said predefined zone,
so as to obtain the deformed chordae geometry.

14. A non-volatile computer storage medium comprising instructions which, when executed by a computer, cause the computer to carry out at least: generating a mesh of the open mitral valve, generating a mesh of the closed mitral valve, deriving a first chordae geometry, deforming the first chordae geometry according to claim 1.

15. A system for reconstructing the geometry of a mitral valve of a subject based on a sequence of echography images acquired from the subject, the sequence of echography images representing the mitral valve apparatus during at least one heart cycle, the system comprising at least one processing unit configured to:
generate a mesh of an open mitral valve based on a subset of open instance images;
generate a mesh of a closed mitral valve based on a subset of closed instance images in the sequence of echography images;
identify a position of the papillary muscle tips of the subject in the subset of open instance images and a position of the papillary muscle tips in the subset of closed instance images;
for at least one predefined zone of each leaflet of the mitral valve, determine a corresponding open position in the mesh of the open mitral valve, and a corresponding closed position in the mesh of the closed mitral valve;
derive a first chordae geometry, based on the identified position of the papillary muscle tips in the subset of closed instance images and on the determined closed position of each of the at least one predefined zone;
deforming the first chordae geometry based on a result of comparing:
the identified positions of the papillary muscle tips in the subset of open instance images and in the subset of closed instance images; and
for each predefined zone, the corresponding determined open position and closed position,
so as to obtain a deformed chordae geometry.

16. The system of claim 15, further comprising a graphical user interface GUI communicating with the at least one processing unit, wherein the at least one processing unit is further configured to receive from the user through the GUI, at least one of:
a selection of a subset of open instance images or a selection of a subset of closed instance images from the sequence of echography images, the subset of images comprising the mitral valve apparatus;
at least one target landmark in the subset of closed instance images; or at least two reference landmarks in the subset of open instance images;
a region of interest including the lines that most closely fit the mitral valve leaflets in the subset of open instance images;
in the subset of open instance images, a first point on a first side of the mitral valve apparatus and a second point on a second side of the mitral valve apparatus, wherein the first side of the mitral valve apparatus and the second side of the mitral valve apparatus are separated by the mitral valve annulus;
in the subset of open instance images, a first region of interest on the first side of the mitral valve apparatus and a second region of interest on the second side of the mitral valve apparatus;
and wherein the at least one processing unit is configured to perform at least one of:
morphing the mesh of the open mitral valve based on the position of the at least two reference landmarks and the at least one target landmark to generate the mesh of the closed mitral valve;
selecting as the at least one target landmark reference landmarks, at least one point lying on each of the lines;
selecting, as the first point, the center of the first region of interest, and, as the second point, the center of the second region of interest;
obtaining a longitudinal axis by joining the first point and the second point and deriving a sheaf of planes about said longitudinal axis; sampling, from the sheaf of planes, a set of planes spaced about the longitudinal axis, and intersecting said set of planes with the subset of closed instance images, so as to obtain sections of said subset of closed instance images; selecting at least one point on each section; interpolating the at least one selected point on each section, so as to obtain a middle plane of each leaflet of the mitral valve, wherein each predefined zone is located on the obtained the middle plane.

* * * * *